US007480680B2

(12) United States Patent
Butash et al.

(10) Patent No.: US 7,480,680 B2
(45) Date of Patent: Jan. 20, 2009

(54) VALIDATING APPLICATION RESOURCES (75) Inventors: Robert A. Butash, Troy, MI (US); Joel S. Goldberg, Silver Spring, MD (US)

(73) Assignee: Electrode Data Systems Corporation, Plano, TX (US)

( * ) Notice: Subject to any disclaimer, the term of this patent is extended or adjusted under 35 U.S.C. 154(b) by 383 days.

(21) Appl. No.: 11/116,985

(22) Filed: Apr. 28, 2005

(65) Prior Publication Data

US 2006/0248123 A1 Nov. 2, 2006

(51) Int. Cl.
*G06F 17/30* (2006.01)
(52) U.S. Cl. .................................... 707/201; 707/104.1
(58) Field of Classification Search ............. 707/104.1, 707/3, 10, 102, 201; 348/461, 473
See application file for complete search history.

(56) References Cited

U.S. PATENT DOCUMENTS

| 6,151,022 A * | 11/2000 | Alshibani et al. ........... 715/788 |
| 6,487,713 B1 | 11/2002 | Cohen et al. |
| 6,636,268 B1 * | 10/2003 | Ngai ........................ 348/478 |
| 7,158,965 B1 * | 1/2007 | Greenberg et al. ............. 707/3 |
| 2006/0130066 A1 * | 6/2006 | Bozak et al. ................ 718/104 |

OTHER PUBLICATIONS

Notification of Transmittal of The International Search Report and The Written Opinion of the International Searching Authority of Application No. PCT/US2006/010163 filed Mar. 20, 2006 ; mailed Mar. 21, 2007 (13 pages).
Anonymous: "*HiSoftware Link Validation Utility—Features*" Internet Article, Feb. 28, 2003, pp. 1-4, /XP002423167, <http://web.archive.org/web/20030228063958/http://www.hisoftware.com/linkvalidate/indexf.html>.
Anonymous: "*Internet Achive Wayback Machine*", Internet Archive, Mar. 5, 2007, XP002423168 (1 page), <http://web.archive.org/web/*/http://www.hisoftware.com/linkvalidate/indexf.html>.
Anonymous: "*HiSoftware Link Validation Tool*", Internet Article, 0303/2003, XP002423169 (1 page), <http://web.archive.org/web/20030303103611/http://www.hisoftware.com/linkvalidate/index.html>.
Anonymous: "*Internet Achive Wayback Machine*", Internet Archive, Mar. 5, 2007, XP002423170 (1 page), <http:web.archive.org/web/*.http:...www.hisoftware.com/linkvalidate/index.html>.
Anonymous: "*IBMRedbooks—Content Manager Validation Utilities*", Internet Article, Dec. 22, 2003, pp. 1-4, XP002423171.
Technical Architecture Services: General Reusable Netcentric Delivery Solution (GRNDS), Accenture, (2 pages) found at: http://www.accenture.com/accenture/registration/PrintThis.aspx?GUID={91569D49-6D61 dated Aug. 30, 2006.
EDS Case Study entitled "EDS revamps consumer portal, enhancing user experience and competitive edge", (2 pages).

(Continued)

*Primary Examiner*—Charles Rones
*Assistant Examiner*—Fariborz Khoshnoodi
(74) *Attorney, Agent, or Firm*—Fish & Richardson P.C.

(57) ABSTRACT

In one general aspect, a method for validating resources includes identifying a first resource file associated with an application. The first resource file includes a reference for identifying at least a portion of a second resource file. An error is determined to be included in the reference. A report of the error is automatically generated.

17 Claims, 3 Drawing Sheets

OTHER PUBLICATIONS

Press release entitled: "Apache Beehive Incubation Status", The Apache Software Foundation, (7 pages), found at: http://incubator.apache.org/projects/beehive.html Dated Aug. 30, 2006.

Notification of Transmittal of The International Preliminary Report on Patentability and Written Opinion of application PCT/US2006/010163 filed Mar. 20, 2006, mailed Nov. 8, 2007 (8 pages).

* cited by examiner

VALIDATING APPLICATION RESOURCES

TECHNICAL FIELD

This invention relates to software development and, more particularly, to validating application resources.

BACKGROUND

Complex software projects typically require the development of multiple modules, components, objects, and/or files. These elements may include reusable parameters, classes, functions, routines, or subroutines that provide frequently-needed information or perform frequently-needed methods. In addition, these elements may include interdependencies such that an element may rely on a different element when providing information and/or performing a task.

SUMMARY

In one general aspect, a method for validating resources includes identifying a first resource file associated with an application. The first resource file includes a reference for identifying at least a portion of a second resource file. An error is determined to be included in the reference. A report of the error is automatically generated.

Implementations can include one or more following features. A configuration file is identified in response to a user requests, wherein the first resource file is identified using the configuration file. At least a portion of the reference from the identified first resource file is retrieved, wherein the error is determined using the at least a portion of the reference. A presentation is generated based, at least in part, on the report. The presentation is displayed to user.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
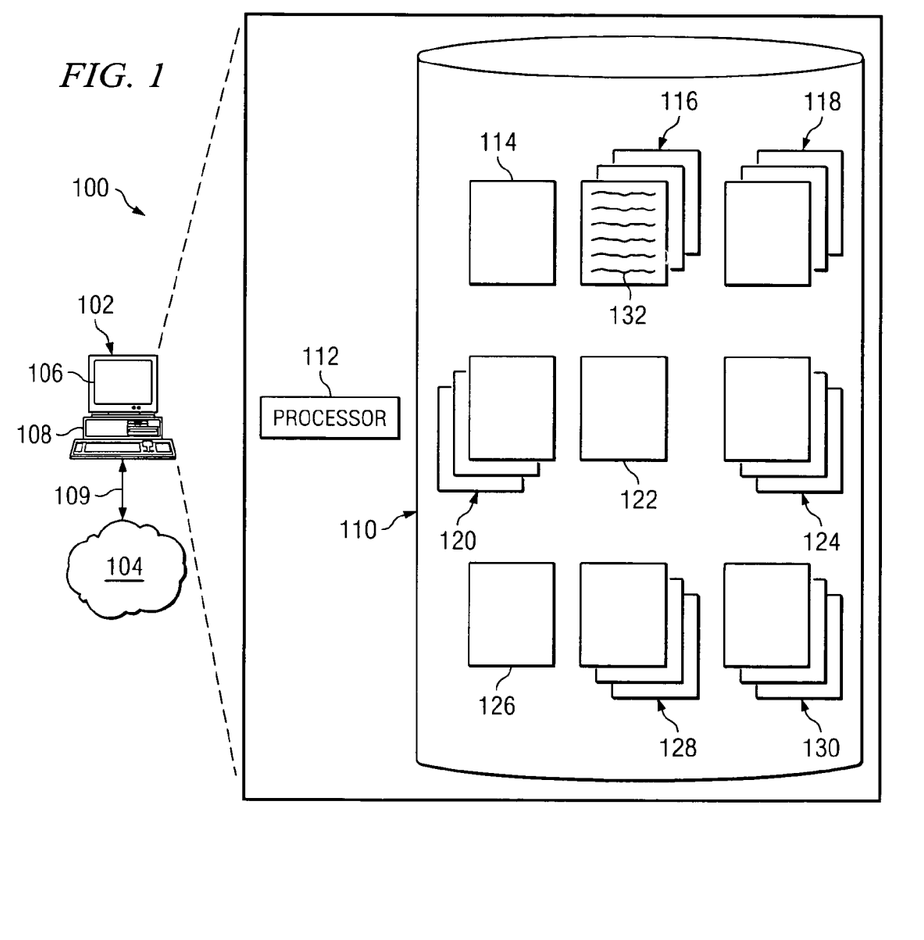
FIG. 1 is a block diagram illustrating a validation system.

FIG. 1 is a block diagram of a validation system 100 for verifying the interdependencies of resource files utilized by an application during execution. For example, a developer of an application 114 may intend to invoke resource files 116 during execution of the application 114. Such resource files 116 may be interdependent and include cross-references to other resource files 116. However, errors in these references (e.g., omissions, typographical errors, incompatibility) may prevent the application 114 from operating as intended. Conventionally, the application 114 would be run through a system test to ensure the application 114 works as intended but this process can be lengthy and is often limited in scope. As a result, undetected errors may cause hard to detect production problems. For example, with the evolution of J2EE, more information is being taken from application code and placed into externalized configuration files. In this case, such files are often highly interdependent in nature with not only other configuration code but also the application code. To facilitate error detection of these interdependencies, the system 100 automatically verifies the references included in the resource files 116 and may generate reports detailing the results. At a high level, system 100 may be a single computer 102 or any portion of a distributed or enterprise system including at least computer 102, perhaps communicably coupled to a network 104. For example, computer 102 may comprise a portion of an information management system or enterprise network that provides a number of software applications to any number of clients. Alternatively, computer 102 may comprise a client processing information in a distributed information management system or enterprise network via one or more software applications. In either case, system 100 is any system that provides validators 124 for verifying references to external (another file) or internal (same file) references. In certain embodiments, the disclosed techniques may allow developers to quickly and easily verify references in the resource file 116.

The system 100 includes the application 114 and its associated resource files 116, a utility 118, configuration files 120, a validation manager 122, validators 124, a parser manager 126, parsers 128, and resource objects. The utility 118 may receive a request from a user of and/or process in system 100 to verify the references 132 contained in the resource files 116. In response, the utility 118 may instantiate the validation manager 122 and the parser manager 126 and invoke the validation manager 122 to verify the references 132. The validation manager 122 may then retrieve information from the configuration file 120 to locate class definitions for the validators 124 and, once located, instantiate the validators 124. Each validator 124 then invokes the parser manager 126 to parse the associated reference files 116 into the resource objects 130. The parser manager 126 uses information received from the validators 124 to locate the class definition for the associated parsers 128 and instantiates the parsers 128. The parser manager 126 may use the configuration file 120 to locate the class definitions for the parsers 128. The parsers 128 then parse the associated reference files 116 into the resource objects 130 and passes them to the parser manager 126. The parser manager 126 caches the resource objects 130 and communicates each resource object 130 to their associated validator 124. The validators then verify the references 132 using the information contained in the resource objects 130. The results of this determination are then communicated to the validation manager 122, who in turn communicates the results to the utility 118. The utility 118 may then generate a report based, at least in part, on these results and communicate it to the requesting user and/or process.

Computer 102 includes a Graphical User Interface (GUI) 106, network interface 108, memory 110, and processor 112. In certain embodiments, computer 102 further includes or references an application 114 and a validation utility 118 that may be stored in memory 110 and may be processed by processor 112. FIG. 1 illustrates only one example of a computer that may be used. Computers other than general purpose computers as well as computers without conventional operating systems can also be used. As used in this document, the term "computer" is intended to encompass a mainframe, a personal computer, a client, a server, a workstation, a network computer, a personal digital assistant, a mobile phone, or any other suitable local or remote processing device.

GUI 106 comprises a graphical user interface operable to allow the user of computer 102 to interact with processor 112. Generally, GUI 106 provides the user of computer 102 with an efficient and user-friendly presentation of data provided by computer 102. GUI 106 may comprise a plurality of displays having interactive fields, pull-down lists, and buttons operated by the user. And in one example, GUI 106 presents an explore-type interface and receives commands from the user. It should be understood that the term graphical user interface may be used in the singular or in the plural to describe one or more graphical user interfaces in each of the displays of a particular graphical user interface. Further, GUI 106 can be any graphical user interface, such as a generic web browser, that processes information in computer 102 and efficiently presents the information to the user. Network 104 can accept data from the user of computer 102 via the web browser (e.g., Microsoft Internet Explorer or Netscape Navigator) and return the appropriate HyperText Markup Language (HTML) or eXtensible Markup Language (XML) responses.

As appropriate, computer 102 generates requests and/or responses and communicates them to another client, server, or other computer systems located in or beyond network 104. For example, computer 102 may receive requests for services from application 114 and/or utility 118. Network 104 facilitates wireless or wireline communication between computer 102 and any other computer. Network 104 may communicate, for example, Internet Protocol (IP) packets, Frame Relay frames, Asynchronous Transfer Mode (ATM) cells, voice, video, data, and other suitable information between network addresses. Network 104 may include one or more local area networks (LANs), radio access networks (RANs), metropolitan area networks (MANs), wide area networks (WANs), all or a portion of the global computer network known as the Internet, and/or any other communication system or systems at one or more locations. Illustrated computer 102 includes network interface 108 for communicating with other computer systems over network 104 such as, for example, in a client-server or other distributed environment via link 109. Generally, interface 108 comprises logic encoded in software and/or hardware in any suitable combination to allow computer 102 to communicate with network 104 via link 109. More specifically, interface 108 may comprise software supporting one or more communications protocols associated with link 109 and communication hardware operable to communicate physical signals.

Memory 110 may include any memory or database module and may take the form of volatile or non-volatile memory including, for example, magnetic media, optical media, Random Access Memory (RAM), Read Only Memory (ROM), removable media, or any other suitable local or remote memory component. In the illustrated embodiment, memory 110 includes or references the application 114, the reference files 116, the utility 118, the configuration file 120, the validation manager 122, the validators 124, the parser manager 126, parsers 128, and resource objects 130. The application 114 is any suitable application running on computer 102 that is operable to invoke the resource files 116 for retrieving data and/or executing code. For example, application 114 may comprise a Web-based program, a data management tool, an enterprise application, or any other software application that is operable to receive and/or transmit information to the resource files 116. In some instances, the application 114 is a J2EE based web application. It will be understood that while application 114 is illustrated as a single multitasked module, the features and functionality performed by this engine may be performed by multiple modules. Moreover, application 114 may comprise a child or submodule of another software module, not illustrated. In any case, the application 114 often relies on the resource files 116 during execution.

Each resource file 116 includes rules, instructions, parameters, algorithms, and/or other directives used by the application 114 to provide data and/or perform tasks. The resource file 116 may comprise a file, script, executable, template or any other suitable description such that the application 114 may perform the services requested by the user of the application 114. In some instances, the resource file 116 is a configuration file that may register and configure objects, provide navigation rules, and reference other resource files 116. The resource file 116 may comprise an XML document, a properties file in name-value-pair format, Java class files, Java-Server-Page files, a JSP tag library, a Struts file, a Tile file, and others. The resource file 116 may be created or supplied by computer 102, a third party, or any other suitable user of system 100. In some instances, the resource file 116 includes either source code written in or an executable code based on any appropriate language such as, for example, C, C++, Java, Perl, and others. In the illustrated instances, the resource file 116 relies on other resource files 116 to provide the data and/or perform the tasks requested by the application 114. In some examples, the resource file 116 references a plurality of other resource files 116 during execution of the application 114. In combination or alternatively, one or more other resource files 116 may reference the resource file 116 during execution of the application 114. In short, the resource file 116 includes one or more references 132.

Each reference 132 includes rules, instructions, parameters, algorithms, and/or other directives used by the computer 102 to identify one or more resource files 116. For example, the application 114 and/or the resource file 116 (if an executable) may use the reference 132 to identify another resource file 116 in order to retrieve data and/or perform a task. Moreover, the reference 132 may identify a portion of a resource file 116. Further, the identified portion may be external or internal to the resource file 116 that contains the reference 132. The reference 132 may comprise a file address, a pointer, a file name, or any other suitable structure for identifying associated resource files 116. In some instances, the reference 132 is a string that identifies the associated resource file 116 by file name.

The utility 118 is operable to process requests to validate the resource files 116 and generate reports based on the results of the validation process. The utility 118 is typically software and may be written or described in any appropriate computer language including, for example, C, C++, Java, J#, Visual Basic, assembler, Perl, any suitable version of 4GL, or any combination thereof. As used herein, software generally includes any appropriate combination of software, firmware, hardware, and/or other logic. Software may be stored in an article including machine-readable medium. The utility 118 may receive a request directly from the user of computer 102, a process running on computer 102, and/or a process or user in network 104. In response to the request, the utility 118 may instantiate the validation manager 122 and/or the parser manager 126 using the configuration file 120. In this case, the utility 118 may retrieve the class definition directly from the configuration file 120 or retrieve information operable to identify the location of the appropriate class definitions. After retrieving the definitions, the utility 118 inserts the appropriate values to instantiate the validation manager 122 and/or the parser manager 126. For example, the utility may provide the filename of the configuration file 120 or other suitable information operable to identify the location of the configuration file 120. After the validation manager 122 and/or the parser manager 126 are generated, the utility 118 invokes the validation manager 122 to validate the references 132 in resource files 116 and/or the parser manager 126 to parse of one or more resource files 116. Afterwards, the utility 118 may receive information associated with the validation process from the validation manager 122 and, in response, generate a report detailing the results using the received information. For example, the utility 118 may generate a report identifying specific resource files 116 that include errors in their references 132. An error may include omission, typographical error, reference to nonexistent resource files 116, incorrect format, incompatibility, or other inaccuracies that would result in the application 114 not executing as intended. In some instances, a user or process in system 100 may initiate the utility 118 by providing or scheduling via GUI 106 the filename of the configuration file 120.

The configuration file 120 include rules, instructions, parameters, algorithms, and/or other directives used by the computer 102 to identify locations of resource files 116 and class definitions for various elements. The directives may identify a location of all resource files 116 associated with the application 114 or a subset of the resource files 116 associated with the application 114, or each directive may identify the location of a single resource file 116. The resource file 116 may be identified by file name, directory path, pointer, or other suitable information that identifies or is operable to identify the location of the associated resource file 116. In some instances, the configuration file 120 includes a single directory path identifying the location of all resource files 120. In addition to the resource file locations, the configuration file 120 may also identify the location of class definitions for instantiating the validation manager 122, the validators 124, the parser manager 126, and the parsers 128. As with the resource files 116, the location of the class definitions may be identified by class name, directory structure, filename or any other suitable information such that computer 102 may generate the validation manager 122, the validators 124, the parser manager 126, and/or the parsers 128. In some instances, the configuration file 120 contains a single filename string identifying the location of all class definition (e.g. Java or Zip file). In some instances, the configuration file 120 is a properties file containing key value pairs. For example, the configuration file 120 may contain a key and a configuration path or filename for the associated elements. Each configuration file 120 may be associated with a specific resource file 116, a plurality of resource files 116, a portion of one or more resource files 116 or a plurality of configuration files 120 may be associated with a specific resource file 116.

The validation manager 122 manages, directs, or otherwise monitors the validation process. For example, the validation manager 122 may generate validators 124, receive information identifying error conditions from the validators 124, and/or transmits the error conditions to the utility 118. The validation manager 122 may receive a request or be invoked by the utility 118 to initiate the validation process. In response to either the request or invocation, the validation manager 122 identifies the configuration file. The validation manager 122 may identify the configuration files 120 using a filename, directory path, or any other suitable identifier received from the utility 118. After identifying the configuration files 120, the validation manager 122 determines the resource files 116 to be validated and the location of class definitions for generating the validators 124 using the configuration file 120. Such information may include a file name, a path name, or any other suitable information that identifies a file, a portion of a file, a data structure, executable, or others. In addition, validation manager 122 retrieves the class definitions for the identified validators 124. In some instances, validation manager 122 identifies a class definition for each validator 124. After locating the class definitions, the validation manager 122 provides values in order to instantiate validators 124. In some instances, the validation manager 122 generates using the configuration files 120 a validator 124 for each resource file 116 to be validated.

The validation manager 122 instantiates one or more validators 124. The validators 124 are operable to determine whether the references 132 include errors. For example, the validator 124 may determine that the reference 132 was omitted, is the wrong format (e.g., incorrect path name), a typographical error, or other errors preventing the validator 124 from locating the associated resource file 116. In other words, the validators 124 may determine whether the reference 132 exists and/or is in the correct format and, if so, whether it identifies a valid resource file 116 or portion of a resource file 116. For example, the validator 124 may retrieve information associated with references 132 from resource objects 130 (discussed below) and, using the references 132, attempt to locate the referenced resource file 116 or portion of a resource file 116. In the event that the referral resource file 116 is external, the validator 124 requests the associated resource object 130 for the parser manager. The validator 124 may be associated with a single resource object 130 or a plurality of resource objects 130, or a plurality of validators 124 may be associated with a single resource object 130. In the event that the associated resource object 130 has not been generated, the validator 124 may invoke the parser manager 126 to generate the associated resource object 130. In this case, the validator 124 may pass a key to the parser manager 126 and/or the resource file name associated with the resource object 130. After invoking the parser manager 126, the validator 124 may receive the requested resource object 130 from the parser manager 126 and verify the associated references 132 by using information retrieved from the object 130. As discussed above, the validator 124 may retrieve information (e.g., a string) from the object 130 that identifies a location of a resource file 116. Using the retrieved information, the validator 124 verifies whether the resource file 116 is properly referenced. After this determination, the validator 124 communicates the results to the validation manager 122. The results may also provide a reference type, an error type, or other suitable information.

The parser manager 126 manages, directs, or otherwise monitors the parsing process. The parser manager 126 may receive and process requests to parse specified resource files 116 and, in response to the request, generate one or more parsers 128. For example, the parser manager 126 may receive a parsing request from one or more validators 124. The request may include a key, a file name, a file path, or other information operable to identify one or more configuration files 120, a portion of the configuration file 120, or any other suitable information such that the parser manager 126 may generate one or more parsers 128. In some instances, the request merely identifies specific resource files 116 to be parsed. In response to the parsing request, the parser manager 126 may initially determine if the associated resource object 130 is cached. If so, the parser manager 126 communicates the cached resource object 130 to the requesting validator 124. If the resource object 130 is not cached, the parser manager 126 retrieves or otherwise identifies information from one or more configuration files 120 operable to locate a class definition for a parser 128 and/or a location of an associated resource file 116. After identifying a class definition, the parser manager 126 may instantiate one or more parsers 128 for parsing one or more associated resource file 116. In some instances, the parser manager 126 generates a parser 128 for each resource file 116. In some instances, the request includes information directly identifying the location of class definitions and/or specified resource files 116. In this case, the parser manager 128 may directly retrieve the class definitions without relying on the configuration files 120 and instantiate one or more parsers 128 using the class definitions.

The parser 128 is operable to retrieve or otherwise identify information contained in a specified resource file 116 and generate one or more resource objects 130 based, at least in part, on the information. For example, the parser 128 may retrieve one or more references 132 of a specified resource file 116 and generate one or more resource objects 130 using the references 132. In some instances, the parser 128 converts the resource file 116 into an object. In the case that the resource file 116 is an XML document, the parser 128 may remove the XML tags as well as perform other steps when generating the resource object 130. Each parser 128 may be associated with one resource file 116, a plurality of resource files 116, or a portion of one or more resource files 116, or a plurality of parsers 128 may be associated with a single resource file 116. In some instances, the parser 128 receives information identifying the location of a specified resource file 116 and/or a portion of a resource file 116 from the parser manager 126. In this case, the parser 128 may automatically retrieve the references 132 and generate one more resource objects 130 using the references 132. After generating the resource objects 130, the parsers 128 pass the resource objects 130 to the parser manager 126.

The resource object 130 may include one or more entries or other suitable data structures that reference or otherwise identify specific resource files 116. For example, the resource object 130 may include one or more references 132 or portions of one or more references 132. As discussed above, each reference 132 may identify a different resource file 116, a portion of a different resource file 116, a portion of the same resource file 116 or others. In some instances, the resource object 130 may include portions of one or more references 132. For example, if the reference 132 includes a key and a value, the resource object 130 may merely include the value. In addition, the resource object 130 may include information associated with and/or operable to identify the value. Each resource object 130 may include information associated with a single reference 132, a plurality of references 132, all references 132 of the specific resource file 116, all references 132 of all resource files 116 that at least attempt to identify a particular resource file 116, and/or other suitable information to facilitate the validation process. Further, the resource object 130 may contain information that is not used or otherwise associated with the validation process.

The computer 102 also includes the processor 112. The processor 112 executes instructions and manipulates data to perform the operations of the computer 102 and may be any processing or computing component such as, for example, a central processing unit (CPU), a blade, an application specific integrated circuit (ASIC), or a field-programmable gate array (FPGA). Although FIG. 1 illustrates a single processor 112 in the computer 102, multiple processors 112 may be used according to particular needs, and reference to the processor 112 is meant to include multiple processors 112 where applicable. The processor 112 executes the application 114 and the utility 118.

In one aspect of operation, a developer writes, modifies, or otherwise develops software code for the application 114 and associated resource files 116 that may include cross-references. It will be understood that developing code may include writing a program in a text-based programming language, associating elements in a graphical programming language, making selections in a GUI presented by the computer 102, or performing any other suitable operations to generate the application 114 and/or the resource files 116. During the course of development of the software code, the developer identifies an appropriate place to include the references 132 in the resource files 116. To verify the accuracy of these references, the developer may generate one or more configuration files 120 which often identify the location of resource files 116 and class definitions for the validation manager 122, the validators 124, the parser manager 126, and the parsers 128.

After generating the configuration files 120, the developer may then communicate a request to the utility 118 to initiate the validation process. In response to at least the request, the utility 118 retrieves information from the configuration file to identify the class definitions for the validation manager 122 and the parser manager 126 and instantiates both using the class definitions. After instantiation, the utility 118 invokes the validation manager 122 to generate the appropriate validators 124. The utility 118 may also provide information identifying the configuration files 120 such as the filename. The validation manager 122 retrieves information from the configuration files 120 that identifies the resource files 116 and the class definitions for the validators 124. Using the class definitions, the validation manager 122 instantiates one or more validators 124. The validators 124 then invoke the parser manager 126 to generate the associated resource objects 130. In the case that the resource objects 130 associated with validators 124 are already generated, the parser manager 126 passes the resource objects 130 to the appropriate validators 124. Otherwise, the parser manager 126 generates the parsers 128 using class definitions identified by the configuration file 120.

The parser manager 126 may determine the location of the class definitions using the configuration files 120. Alternatively or in combination, the parser manager 126 may receive information identifying the location the class definitions from the validators 124. Each parser 128 then identifies the associated resource file 116 and generates the resource object 130 using the associated resource file 116. The parsers 128 may retrieve information from the associated resource files 116 such as the references 132 or generate information based, at least in part, on the associated resource files 116. The parsers 128 may include this information in the resource objects 130. After the resource objects 130 are generated, the resource objects 130 are then passed to the parser manager 126, which caches the resource objects 130 and communicates the resource objects 130 to the appropriate validator 124. The validators 124 determine whether the references 132 to the resource files 116 are accurate. For example, the validators 124 may verify that the references actually identify an existing file, is in the correct format, is not omitted, or other errors that would prevent the application 114 from functioning as intended. The results of this validation process are transmitted to the validation manager 122 which in turn transmits the results to the utility 118. The utility 118 may generate a presentation including the results and display the presentation to the developer.

Figure 2:
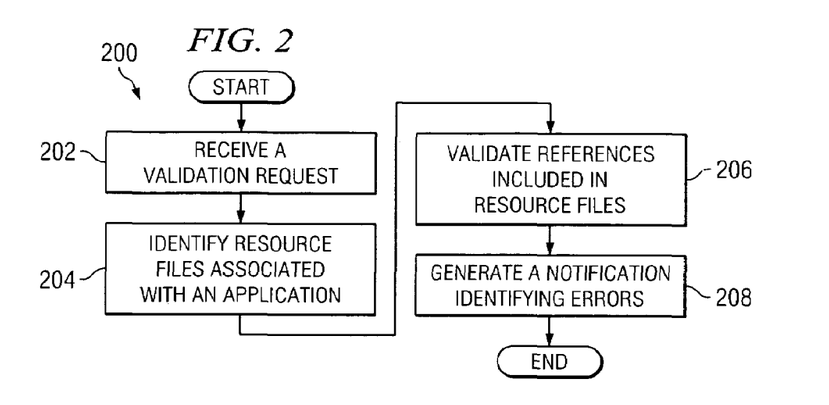
FIG. 2 is a flow diagram illustrating a process for validating resources.

FIG. 2 is a flowchart illustrating an example method 200 for validating the references 132 in the resource files 116. The following description focuses on the operation of the system 100 in performing method 200. But system 100 may use any appropriate combination and arrangement of logical elements implementing some or all of the described functionality.

Method 200 begins at step 202 where the utility 118 receives a validation request from a user or process in system 100. For example, a user of computer 102 may make a selection via GUI 106. In some instances, the user may select or otherwise provide the file name of the configuration file 120. Next, at step 204, the computer 102 identifies the resource files 116 using the validation request. As discussed above, the computer 102 may identify the resource files 116 using the configuration file 120. At step 206, the computer 102 verifies the references 132 included in the resource files 116. The computer 102 may verify that the references 132 are accurate such as by determining that they are not omitted, are in the correct format, or identify existing content. The utility 118 generates a notification to the user identifying any errors in the references 132 at step 408.

Figure 3A:
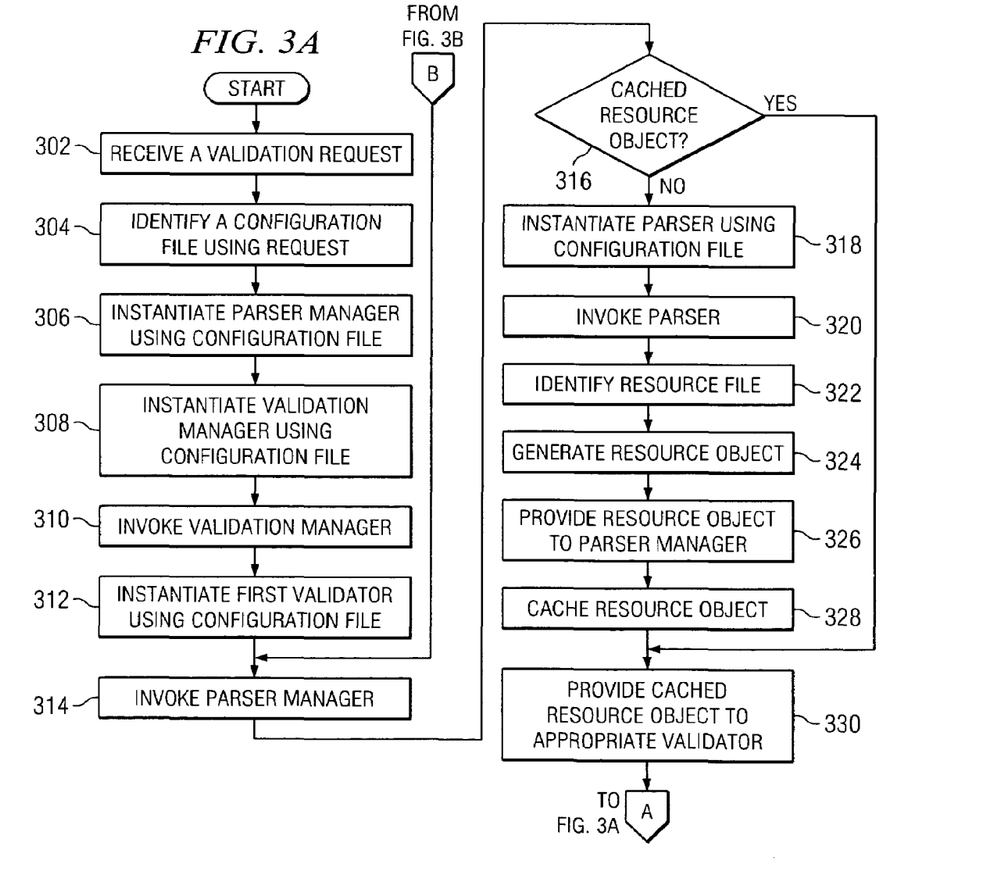
FIGS. 3A-B is another flow diagram illustrating a process for validating resources.
Figure 3B:
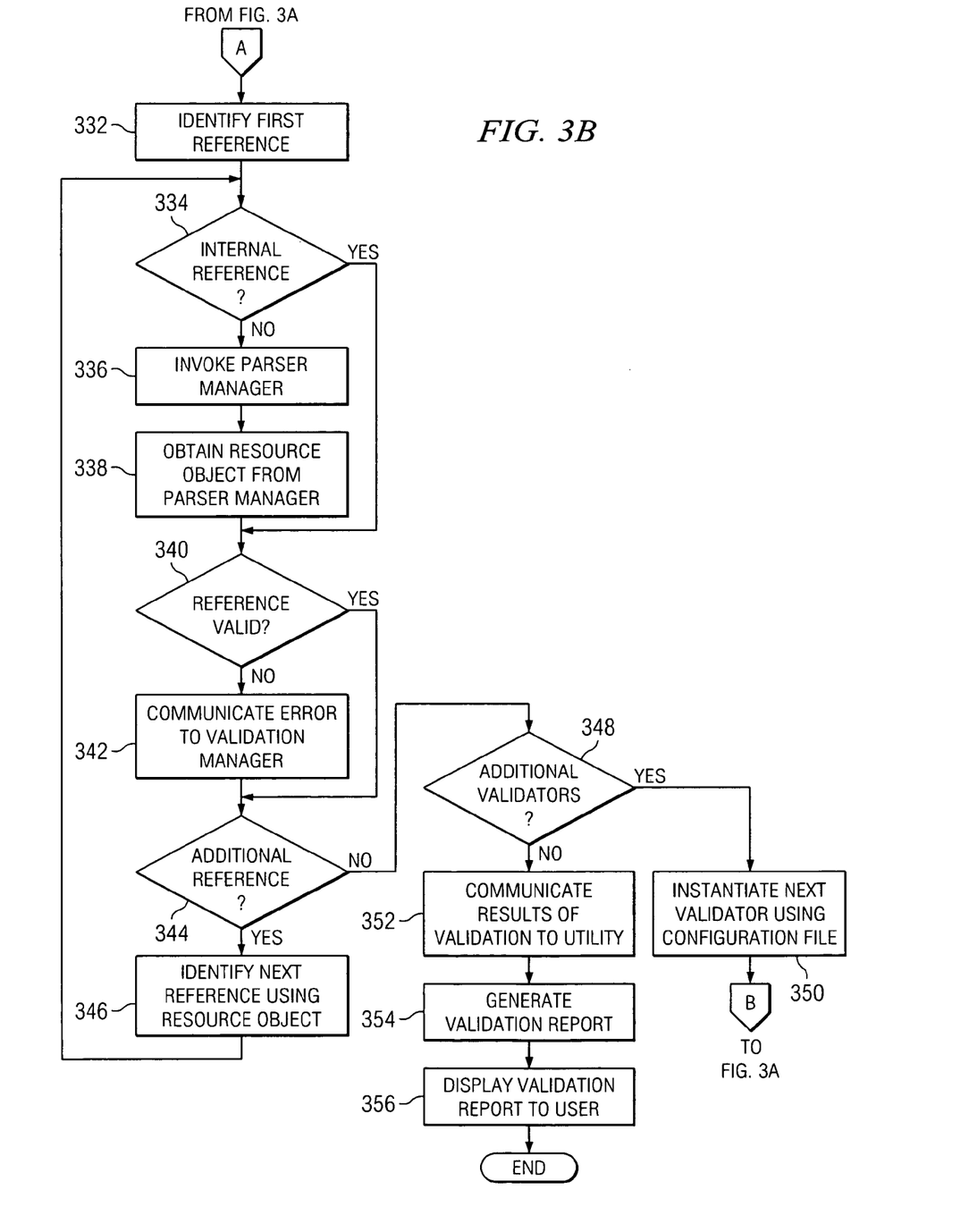

FIGS. 3A-B is a flowchart illustrating example method 300 for validating the references 132 in the resource files 116. Generally, method 300 describes one example technique for the system 100 to use the validators 124 to verify the references 132. The following descriptions will focus on the operation of the system 100 in performing this method. But, as with the previous flowchart, system 100 can use any appropriate combination and arrangement of logical elements implementing some or all of the described functionality.

Method 300 begins at step 302 where the utility 118 receives a validation request from either a user of or process running in system 100. The utility 118 identifies a configuration file 120 using the validation request at step 304. Next, at step 306, the utility 118 instantiates the parser manager 126 using the configuration file 120. Also, the utility 118 instantiates the validation manager 122 using the configuration file 120 at step 308. After instantiation, the utility 118 invokes the validation manager 122 to begin the validation process at step 310. At step 312, the validation manager 122 instantiates a first validator 124 using the configuration file 120. Next, at step 314, the instantiated validator 124 invokes the parser manager 126 to parse an associated resource file 116 into the associated resource object 130. If the associated resource object 130 is not cached at decisional step 316, then, at step 318, the parser manager 126 instantiated the parser 128 using the configuration file 120. The parser manager 126 then invokes the parser 128 to parse the associated resource file 116 at step 320. The parser 128 first identifies the associated resource file 116 at step 322 and then generates the resource object 130 at step 324. After generating the resource object 130, the parser 128 then provides the resource object 130 to the parser manager 126 at step 326. Next, at step 328, the parser manager 126 caches the resource object 130. Returning to decisional step 316, if the resource object 130 is cached, then execution proceeds to step 330. The parser manager 126 provides the cached resource object 130 to the appropriate validator 124.

After receiving the resource object 130, the validator 124 identifies a first reference 132 at step 332 using the resource object 130. If the reference 132 is not an internal reference at decisional step 334, then, at step 336, the validator 124 invokes the parser manager 126 for the associated resource object 130. At step 338, the validator 124 obtains the associated resource object 130 from the parser manager 126. If the reference 132 is not valid at decisional step 340, then, at step 342, the validator 124 communicates an error notification to the validation manager 122. Otherwise, execution proceeds to decisional step 344. If an additional reference 132 is included in the identified resource object 130, then, at step 346, the validator 124 identifies the next reference 132 using the resource object 130. Execution then returns to decisional step 334. Otherwise, execution proceeds to decisional step 348. If an additional validator 124 is to be generated, then, at step 350, the validation manager 122 instantiated the next validator 124 using the configuration file 120. Otherwise, the validation manager 122 communicates the results of the validation process to the utility 118 at step 352. Next, at step 354, the utility 118 generates a validation report identifying the errors in the references 132. At step 356, the utility 118 displays the validation report to the user via GUI 106.

The preceding flowcharts and accompanying description illustrate exemplary methods 200 and 300. System 100 may use any suitable technique for performing these and other tasks. In addition, many of the steps in these flowcharts may take place simultaneously and/or in different orders than as shown. Moreover, system 100 may use methods with additional steps, fewer steps, and/or different steps.

Although certain embodiments and generally associated methods have been described, alterations and permutations of these embodiments and methods will be apparent to those skilled in the art. Accordingly, the above description of example embodiments does not define or constrain the invention. Other changes, substitutions, and alterations are also possible without departing from the scope of the following claims.

What is claimed is:

1. An article comprising a removable storage media storing instructions for causing data processing apparatus to:
   select a configuration file including information that identifies a first location of a first resource file and a second location of a second resource file, wherein the first resource file is identified using the configuration file;
   identify the first resource file associated with an application under development, wherein the first resource file includes a reference for identifying at least a portion of the second resource file, the first resource file and the second resource file adapted for processing by the application during execution;
   dynamically determine class definitions for instantiating a parser and a validator;
   instantiate, using the configuration file, the parser configured to parse the first resource file and the validator configured to verify the reference;
   processing the first resource file to verify the reference to the second resource file using the parser and the validator different from the application;
   determine, using the parser and the validator, that the reference to the second resource file includes an error preventing the application under development, when executed, from processing the at least second portion; and
   automatically generate a report identifying the first resource file as including the error.

2. The article of claim 1, wherein the first resource file comprises the second resource file.

3. The article of claim 1, the instructions for causing data processing apparatus to identify a configuration file in response to a user request, wherein the first resource file is identified using the configuration file.

4. The article of claim 1, the instructions for causing data processing apparatus to retrieve at least a portion of the reference from the identified first resource file, wherein the error is determined using the at least a portion of the reference.

5. The article of claim 4, wherein the error is determined based on the at least a portion of the reference including a typographical error, being in an incorrect format, or not identifying the second resource file.

6. The article of claim 1, the instructions for causing data processing apparatus to parse the second resource file into an object in response to identifying the first resource file, wherein the error is determined using the object.

7. The article of claim 6, wherein the configuration file comprises a properties file in a format including keys and associated values.

8. The article of claim 1, wherein the first resource file is identified using a configuration file and the reference comprises a first reference, the instructions for causing data processing apparatus to:
- identify a modified configuration file in response to a user request, wherein the user generates the modified configuration file by modifying the configuration file;
- identify a third resource file using the modified configuration file, wherein the modified configuration file includes a second reference for identifying at least a portion of a fourth resource file, the third and fourth resource files different from the first resource file and the second resource file;
- determine that the second reference includes an error; and
- automatically generate a report relating to the error in the second reference.

9. The article of claim 1, the instructions for causing data processing apparatus to:
- generate a presentation based, at least in part, on the report; and
- display the presentation to a user.

10. A computer-implemented method, comprising:
- selecting a configuration file including information that identifies a first location of a first resource file and a second location of a second resource file, wherein the first resource file is identified using the configuration file;
- identifying the first resource file associated with an application under development, wherein the first resource file includes a reference for identifying at least a portion of the second resource file, the first resource file and the second resource file adapted for processing by the application during execution;
- dynamically determining class definitions for instantiating a parser and a validator;
- instantiating, using the configuration file, the parser configured to parse the first resource file and the validator configured to verify the reference;
- processing the first resource file to verify the reference to the second resource file using the parser and the validator different from the application;
- determining, without executing the application, that the reference to the second resource file includes an error preventing the application under development, when executed, from processing the at least second portion; and
- automatically generating a report identifying the first resource file as including the error.

11. The method of claim 10, further comprising identifying a configuration file in response to a user request, wherein the first resource file is identified using the configuration file.

12. The method of claim 10, further comprising retrieving at least a portion of the reference from the identified first resource file, wherein the error is determined using the at least a portion of the reference.

13. The method of claim 10, further comprising:
- generating a presentation based, at least in part, on the report; and
- displaying the presentation to a user.

14. A computer-implemented system, comprising:
- memory for storing a first resource file and a second resource file; and
- one or more processors configured to:
  - select a configuration file including information that identifies a first location of the first resource file and a second location of the second resource file, wherein the first resource file is identified using the configuration file;
  - identify the first resource file associated with an application, wherein the first resource file includes a reference for identifying at least a portion of the second resource file;
  - dynamically determine class definitions for instantiating a parser and a validator;
  - instantiate, using the configuration file, the parser configured to parse the first resource file and the validator configured to verify the reference;
  - determine that the reference includes an error using the parser and the validator different from the application; and
  - automatically generate a report relating to the error.

15. The system of claim 14, the processors further configured to identify a configuration file in response to a user request, wherein the first resource file is identified using the configuration file.

16. The system of claim 14, the processors further configured to retrieve at least a portion of the reference from the identified first resource file, wherein the error is determined using the at least a portion of the reference.

17. The system of claim 14, the processors further configured to:
- generate a presentation based, at least in part, on the report; and
- display the presentation to a user.

* * * * *